(12) United States Patent
Paulraj et al.

(10) Patent No.: US 11,836,504 B2
(45) Date of Patent: Dec. 5, 2023

(54) SYNCHRONIZED SHUTDOWN OF HOST OPERATING SYSTEM AND DATA PROCESSING UNIT OPERATING SYSTEM

(71) Applicant: Dell Products L.P., Round Rock, TX (US)

(72) Inventors: Deepaganesh Paulraj, Bangalore (IN); Akkiah Choudary Maddukuri, Austin, TX (US); Timothy M. Lambert, Austin, TX (US); Lee E. Ballard, Georgetown, TX (US); George Harris, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 113 days.

(21) Appl. No.: 17/712,796

(22) Filed: Apr. 4, 2022

(65) Prior Publication Data

US 2023/0315485 A1    Oct. 5, 2023

(51) Int. Cl.
*G06F 9/44* (2018.01)
*G06F 9/4401* (2018.01)

(52) U.S. Cl.
CPC ............ *G06F 9/442* (2013.01); *G06F 9/4403* (2013.01); *G06F 9/4406* (2013.01)

(58) Field of Classification Search
CPC ....... G06F 9/442; G06F 9/4403; G06F 9/4406
See application file for complete search history.

(56) References Cited

U.S. PATENT DOCUMENTS 10,416,751 B2 *  9/2019  Cui ..................... G06F 9/4418
2003/0033546 A1  2/2003  Bresniker et al.
(Continued)

FOREIGN PATENT DOCUMENTS

CN    114117562 A    3/2022
WO  2012158765 A2  11/2012

OTHER PUBLICATIONS

International Search Report and Written Opinion of the International Searching Authority, International Application No. PCT/US2023/010332, dated May 3, 2023.

*Primary Examiner* — Stefan Stoynov
(74) *Attorney, Agent, or Firm* — Jackson Walker L.L.P

(57) ABSTRACT

An information handling system may include a processor, a data processing unit communicatively coupled to the processor, a logic device communicatively coupled to processor and configured to, responsive to a shutdown event associated with the information handling system, cause a power system of the information handling system to maintain delivery of electrical energy to the data processing unit until receiving a command to cause withdrawal of the electrical energy to the data processing unit, and a management controller communicatively coupled to the processor, the data processing unit, and the logic device, and configured for out-of-band management of the information handling system. The management controller may be further configured to, responsive to the shutdown event, cause a host operating system executing the processor to gracefully shutdown, cause a data processing unit operating system executing on the data processing unit to gracefully shutdown, and responsive to receiving an indication that the data processing unit operating system has gracefully shutdown, communicate the command to the logic device to cause withdrawal of the electrical energy to the data processing unit.

12 Claims, 2 Drawing Sheets

(56) References Cited

U.S. PATENT DOCUMENTS

2005/0266801 A1* 12/2005 Mathews .............. H04L 65/765
  455/66.1
2018/0011714 A1* 1/2018 Han ...................... G06F 3/0685
2018/0059752 A1 3/2018 Khatri et al.

* cited by examiner

SYNCHRONIZED SHUTDOWN OF HOST OPERATING SYSTEM AND DATA PROCESSING UNIT OPERATING SYSTEM

TECHNICAL FIELD

The present disclosure relates in general to information handling systems, and more particularly to methods and systems for synchronized shutdown of a host operating system and a data processing unit operating system within an information handling system.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems are increasingly using data processing units or DPUs. A DPU may be thought of as a "system within a system" or "computer within a computer," in that a DPU may comprise a specialized card with its own processor, local storage, and operating system stored on such local storage. One example of a DPU is a smart network interface card or "smartNIC" that may offer capabilities not found in traditional network interface cards (NICs). In addition to the stateful and custom offloads a smartNIC may provide, it may have an independent management domain with a separate operating system, independent credentials, and independent remote access.

During a power off/power cycle of an information handling system host, the basic input/output system or host operating system of the information handling system writes a full reset to the information handling system chipset. Because a DPU may be plugged into an ordinary Peripheral Component Interconnect Express (PCIe) slot, during the power off/power cycle the DPU may receive a fundamental reset signal (e.g., a "PERST" signal) followed by a loss of power which may result in an ungraceful shutdown of the DPU operating system. Such ungraceful shutdown may result in data loss and potentially corrupt the internal persistent data storage of the DPU.

SUMMARY

In accordance with the teachings of the present disclosure, the disadvantages and problems associated with ungraceful shutdowns of a DPU operating system may be reduced or eliminated.

In accordance with embodiments of the present disclosure, an information handling system may include a processor, a data processing unit communicatively coupled to the processor, a logic device communicatively coupled to processor and configured to, responsive to a shutdown event associated with the information handling system, cause a power system of the information handling system to maintain delivery of electrical energy to the data processing unit until receiving a command to cause withdrawal of the electrical energy to the data processing unit, and a management controller communicatively coupled to the processor, the data processing unit, and the logic device, and configured for out-of-band management of the information handling system. The management controller may be further configured to, responsive to the shutdown event, cause a host operating system executing the processor to gracefully shutdown, cause a data processing unit operating system executing on the data processing unit to gracefully shutdown, and responsive to receiving an indication that the data processing unit operating system has gracefully shutdown, communicate the command to the logic device to cause withdrawal of the electrical energy to the data processing unit.

In accordance with these and other embodiments of the present disclosure, a method may be provided for use in an information handling system comprising a processor, a data processing unit communicatively coupled to the processor, a logic device communicatively coupled to the processor and configured to, responsive to a shutdown event associated with the information handling system, cause a power system of the information handling system to maintain delivery of electrical energy to the data processing unit until receiving a command to cause withdrawal of the electrical energy to the data processing unit, and a management controller communicatively coupled to the processor, the data processing unit, and the logic device and configured for out-of-band management of the information handling system. The method may include, responsive to the shutdown event: causing, by the management controller, a host operating system executing the processor to gracefully shutdown; causing, by the management controller, a data processing unit operating system executing on the data processing unit to gracefully shutdown; and responsive to receiving an indication that the data processing unit operating system has gracefully shutdown, communicating, by the management controller, the command to the logic device to cause withdrawal of the electrical energy to the data processing unit.

In accordance with these and other embodiments of the present disclosure, an article of manufacture may include a non-transitory computer-readable medium and computer-executable instructions carried on the computer-readable medium, the instructions readable by a management controller of an information handling system in an information handling system comprising a processor and a data processing unit communicatively coupled to the processor, and the management controller communicatively coupled to the processor, the data processing unit, and the logic device, and configured for out-of-band management of the information handling system. The instructions, when read and executed, may be for causing the management controller to, responsive to the shutdown event, cause a host operating system executing the processor to gracefully shutdown; cause a data processing unit operating system executing on the data processing unit to gracefully shutdown; and responsive to receiving an indication that the data processing unit operating system has gracefully shutdown, communicate the command to a logic device to cause withdrawal of the electrical energy to the data processing unit.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
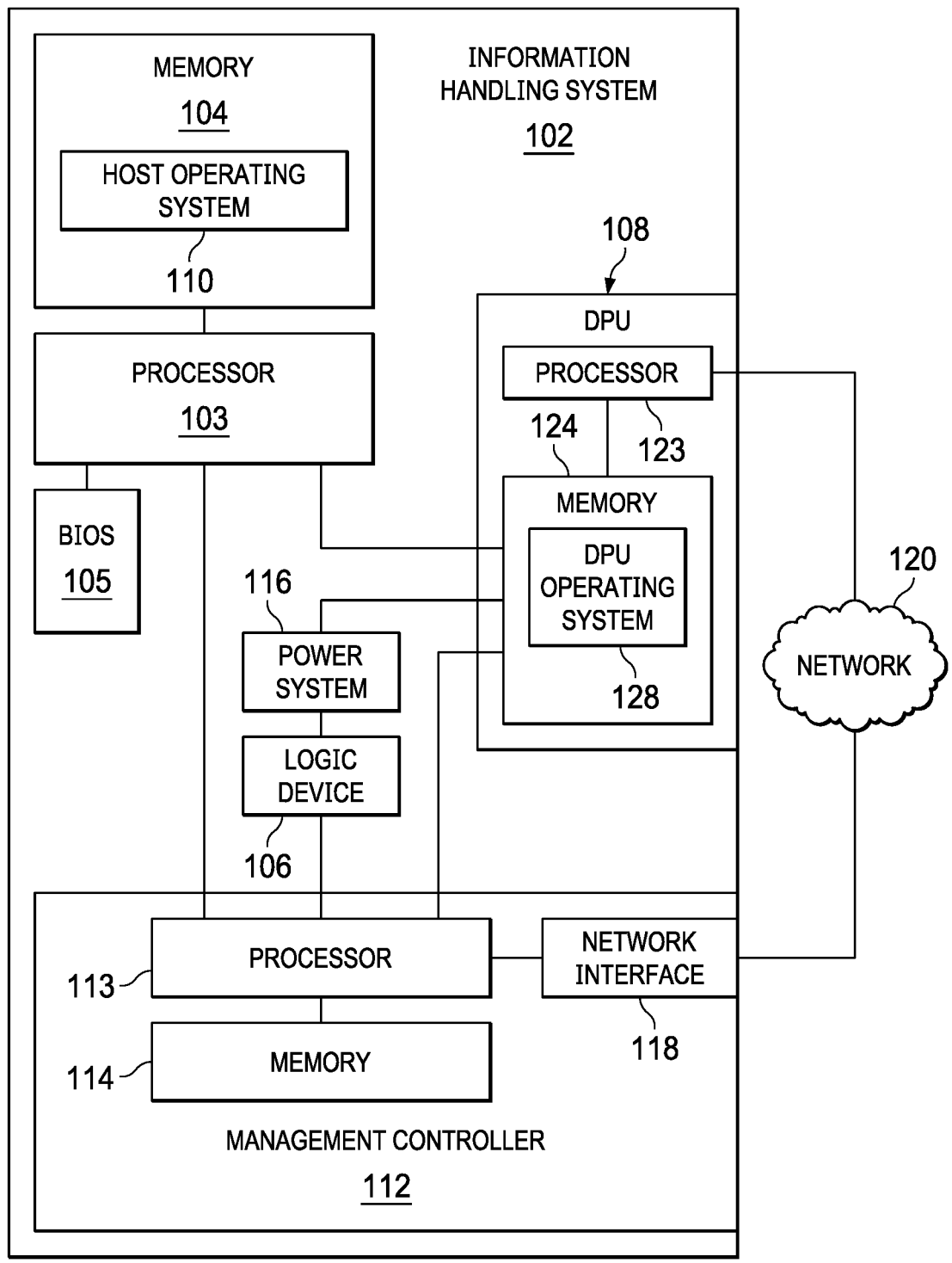
FIG. 1 illustrates a block diagram of an example information handling system, in accordance with embodiments of the present disclosure.
Figure 2:
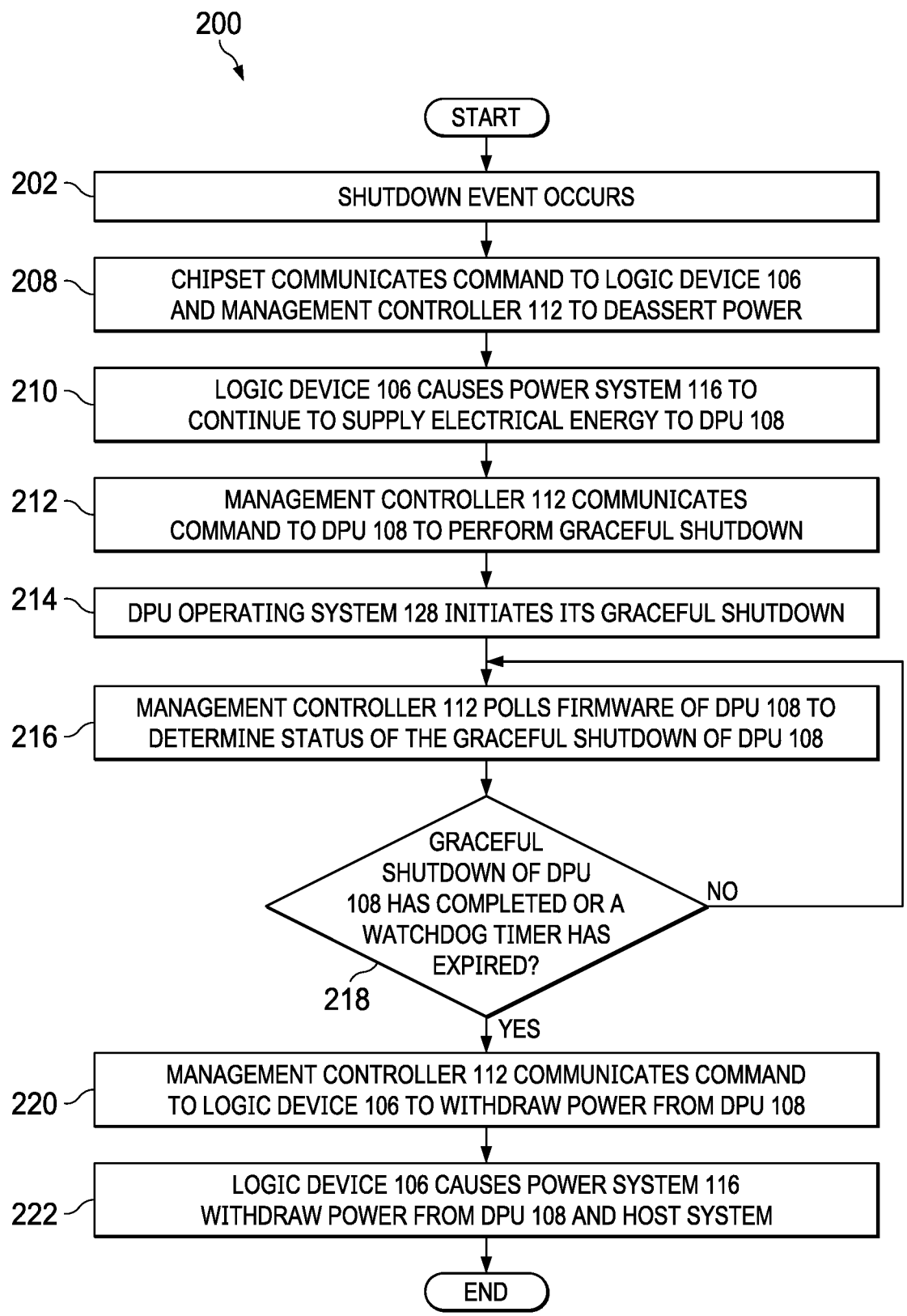
FIG. 2 illustrates a flow chart of an example method for synchronized shutdown of a host operating system and a data processing unit operating system within an information handling system, in accordance with embodiments of the present disclosure.

Preferred embodiments and their advantages are best understood by reference to FIGS. 1 and 2, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU") or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, service processors, basic input/output systems, buses, memories, I/O devices and/or interfaces, storage resources, network interfaces, motherboards, and/or any other components and/or elements of an information handling system.

FIG. 1 illustrates a block diagram of an example information handling system 102, in accordance with embodiments of the present disclosure. In some embodiments, information handling system 102 may comprise or be an integral part of a server. In other embodiments, information handling system 102 may be a personal computer. In these and other embodiments, information handling system 102 may be a portable information handling system (e.g., a laptop, notebook, tablet, handheld, smart phone, personal digital assistant, etc.). As depicted in FIG. 1, information handling system 102 may include a processor 103, a memory 104 communicatively coupled to processor 103, a basic input/output (BIOS) system 105 communicatively coupled to processor 103, a logic device 106 communicatively coupled to management controller 112, a DPU 108 communicatively coupled to processor 103, a management controller 112 communicatively coupled to processor 103 and DPU 108, and a power system 116 configured to distribute electrical energy to components of information handling system 102.

Processor 103 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104 and/or another component of information handling system 102.

Memory 104 may be communicatively coupled to processor 103 and may include any system, device, or apparatus configured to retain program instructions and/or data for a period of time (e.g., computer-readable media). Memory 104 may include RAM, EEPROM, a PCMCIA card, flash memory, magnetic storage, opto-magnetic storage, or any suitable selection and/or array of volatile or non-volatile memory that retains data after power to information handling system 102 is turned off.

As shown in FIG. 1, memory 104 may have stored thereon a host operating system 110. Host operating system 110 may comprise any program of executable instructions, or aggregation of programs of executable instructions, configured to, when executed by processor 103, manage and/or control the allocation and usage of hardware resources of information handling system 102 such as memory, processor time, disk space, and input and output devices, and provide an interface between such hardware resources and application programs hosted by host operating system 110.

BIOS 105 may be communicatively coupled to processor 103 and may include any system, device, or apparatus configured to identify, test, and/or initialize information handling resources of information handling system 102. "BIOS" may broadly refer to any system, device, or apparatus configured to perform such functionality, including without limitation, a Unified Extensible Firmware Interface (UEFI). In some embodiments, BIOS 105 may be implemented as a program of instructions that may be read by and executed on processor 103 to carry out the functionality of BIOS 105. In these and other embodiments, BIOS 105 may comprise boot firmware configured to be the first code executed by processor 103 when information handling system 102 is booted and/or powered on. As part of its initialization functionality, code for BIOS 105 may be configured to set components of information handling system 102 into a known state, so that one or more applications (e.g., an operating system or other application programs) stored on compatible media (e.g., memory 104) may be executed by processor 103 and given control of information handling system 102.

Logic device 106 may comprise any suitable system, device, or apparatus that may perform a specialized function that extends the functionality of information handling system 102. For example, logic device 106 may serve as an interface between management controller 112 and subsystems of information handling system 102 for communication of control information associated with such subsystems. In some embodiments, logic device 106 may comprise a complex programmable logic device (CPLD) or a field-programmable gate array (FPGA).

DPU 108 may comprise any suitable system, apparatus, or device that comprises a specialized card or other peripheral with its own processor, local storage, and operating system stored on such local storage, and may in essence function itself as an information handling system. In some embodiments, DPU 108 may also be known as a smartNIC, functional accelerator card (FAC), functional off-load coprocessor (FOCP), or distributed services card (DSC). As shown in FIG. 1, DPU 108 may comprise a processor 123 and a memory 124.

Processor 123 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 123 may interpret and/or execute program instructions and/or process data stored in memory 124 and/or another component of DPU 108.

Memory 124 may be communicatively coupled to processor 123 and may include any system, device, or apparatus configured to retain program instructions and/or data for a period of time (e.g., computer-readable media). Memory 124 may include RAM, EEPROM, a PCMCIA card, flash memory, magnetic storage, opto-magnetic storage, or any suitable selection and/or array of volatile or non-volatile memory that retains data after power to DPU 108 is turned off.

As shown in FIG. 1, memory 124 may have stored thereon a DPU operating system 128. DPU operating system 128 may comprise any program of executable instructions, or aggregation of programs of executable instructions, configured to, when executed by processor 123, manage and/or control the allocation and usage of hardware resources of DPU 108 such as memory, processor time, disk space, and input and output devices, and provide an interface between such hardware resources and application programs hosted by DPU operating system 128.

Management controller 112 may be configured to provide out-of-band management facilities for management of information handling system 102. Such management may be made by management controller 112 even if information handling system 102 is powered off or powered to a standby state. Management controller 112 may include a processor 113, memory 114, and an out-of-band network interface 118 separate from and physically isolated from an in-band network interface (e.g., DPU 108). In certain embodiments, management controller 112 may include or may be an integral part of a baseboard management controller (BMC), a remote access controller (e.g., a Dell Remote Access Controller or Integrated Dell Remote Access Controller), or an enclosure controller. In other embodiments, management controller 112 may include or may be an integral part of a chassis management controller (CMC).

Processor 113 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 113 may interpret and/or execute program instructions and/or process data stored in memory 114 and/or another component of information handling system 102 or management controller 112.

Memory 114 may be communicatively coupled to processor 113 and may include any system, device, or apparatus configured to retain program instructions and/or data for a period of time (e.g., computer-readable media). Memory 114 may include RAM, EEPROM, a PCMCIA card, flash memory, magnetic storage, opto-magnetic storage, or any suitable selection and/or array of volatile or non-volatile memory that retains data after power to management controller 112 is turned off. Memory 114 may have stored thereon software and/or firmware which may be read and executed by processor 113 for carrying out the functionality of management controller 112.

Network interface 118 may comprise any suitable system, apparatus, or device operable to serve as an interface between management controller 112 and/or one or more other information handling systems. Network interface 118 may enable management controller 112 to communicate using any suitable transmission protocol and/or standard. In these and other embodiments, network interface 118 may comprise a network interface card, or "NIC."

Generally speaking, power system 116 may include any system, device, or apparatus configured to supply electrical current to one or more information handling resources of information handling system 102. Accordingly, power system 116 may include one or more power supply units, one or more voltage regulators, and/or other components. In some embodiments, power system 116 may include one or more programmable components (e.g., a programmable voltage regulator). For purposes of clarity and exposition, power system 116 is depicted in FIG. 1 as being coupled only to logic device 106 and power system 116. However, it is understood that power system 116 may be coupled to other components of information handling system 102 in order to provide electrical energy to such other components.

In addition to processor 103, memory 104, BIOS 105, logic device 106, DPU 108, management controller 112, and power system 116, information handling system 102 may include one or more other information handling resources.

Network 120 may comprise a network and/or fabric configured to couple information handling system 102 to one or more other information handling systems. In these and other embodiments, network 120 may include a communication infrastructure, which provides physical connections, and a management layer, which organizes the physical connections and information handling systems communicatively coupled to network 120. Network 120 may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or any other appropriate architecture or system that facilitates the communication of signals, data and/or messages (generally referred to as data). Network 120 may transmit data via wireless transmissions and/or wire-line transmissions using any storage and/or communication protocol, including without limitation, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or any other transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof. Network 120 and its various components may be implemented using hardware, software, or any combination thereof.

FIG. 2 illustrates a flow chart of an example method 200 for synchronized shutdown of host operating system 110 and DPU operating system 128, in accordance with embodiments of the present disclosure. According to some embodiments, method 200 may begin at step 202. As noted above, teachings of the present disclosure may be implemented in a variety of configurations of information handling system 102. As such, the preferred initialization point for method 200 and the order of the steps comprising method 200 may depend on the implementation chosen.

At step 202, a shutdown event may occur. In some instances, such shutdown event may be an ungraceful shutdown (e.g., as may be invoked via long user press on a power button, an over-temperature condition, or a power system fault). In other instances, such shutdown may be a graceful shutdown (e.g., a user issuing a request to management controller 112 for a graceful shutdown of information handling system 102, a short user press on a power button, or a request to or by operating system 110 for a graceful shutdown).

In the case of a graceful shutdown initiated via management controller 112, management controller 112 may communicate a command to host operating system 110 to perform a graceful shutdown. Whether or not initiated via management controller 112, short power button press, or operating system 110 request, in response to a graceful shutdown request, host operating system 110 may initiate its graceful shutdown, and may write an indication regarding the graceful shutdown request to a chipset (e.g., port CF9) of information handling system 102. However, in the event of an ungraceful shutdown, the chipset or logic device 106 may determine a need to transition the host domain of processor 103 out of its "on" state.

At step 208, the chipset may communicate a command to logic device 106 and management controller 112 to deassert power. At step 210, logic device 106 may cause power system 116 to continue to supply electrical energy to DPU 108 despite the initiation of the graceful shutdown procedure of information handling system 102.

At step 212, management controller 112 may communicate a command to DPU 108 to perform a graceful shutdown. In response, at step 214, DPU operating system 128 may initiate its graceful shutdown.

At step 216, management controller 112 may poll firmware of DPU 108 to determine a status of the graceful shutdown of DPU 108. At step 218, management controller 112 may receive the status of the graceful shutdown for DPU 108 and determine if the graceful shutdown of DPU 108 has completed (or if a watchdog timer has expired). Once graceful shutdown of DPU 108 has completed, method 200 may proceed to step 220.

At step 220, management controller 112 may communicate a command to logic device 106 to withdraw power from DPU 108. At step 222, logic device 106 may cause power system 116 withdraw power from DPU 108 and withdraw power from the host system (e.g., processor 103, memory 104, etc.). After completion of step 222, method 200 may end.

Although FIG. 2 discloses a particular number of steps to be taken with respect to method 200, method 200 may be executed with greater or fewer steps than those depicted in FIG. 2. In addition, although FIG. 2 discloses a certain order of steps to be taken with respect to method 200, the steps comprising method 200 may be completed in any suitable order.

Method 200 may be implemented using information handling system 102 or any other system operable to implement method 200. In certain embodiments, method 200 may be implemented partially or fully in software and/or firmware embodied in computer-readable media.

Ultimately, use of method 200 may leverage existing behavior of operating system 110 and an information handling system chipset. Thus, using the approach of method 200, the operating system 110 and chipset may "think" they have powered off. However, unlike existing approaches, logic device 106 may, instead of powering off information handling system 102, maintain main system power in order to allow DPU 108 sufficient time to gracefully shutdown. Management controller 112 may be aware it resides in an information handling system 102 comprising DPU 108 and a logic device 106 with such capability. Accordingly, management controller 112 may be aware that the request to deassert power does not actually remove power, and thus causes removal of power in response to a graceful shutdown of DPU 108 (or the expiration of the watchdog timer if DPU 108 does not gracefully shutdown within an allowable period of time).

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative. Accordingly, modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

Although exemplary embodiments are illustrated in the figures and described above, the principles of the present disclosure may be implemented using any number of techniques, whether currently known or not. The present disclosure should in no way be limited to the exemplary implementations and techniques illustrated in the figures and described above.

Unless otherwise specifically noted, articles depicted in the figures are not necessarily drawn to scale.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

Although specific advantages have been enumerated above, various embodiments may include some, none, or all of the enumerated advantages. Additionally, other technical advantages may become readily apparent to one of ordinary skill in the art after review of the foregoing figures and description.

To aid the Patent Office and any readers of any patent issued on this application in interpreting the claims appended hereto, applicants wish to note that they do not intend any of the appended claims or claim elements to invoke 35 U.S.C. § 112(f) unless the words "means for" or "step for" are explicitly used in the particular claim.

What is claimed is:

1. An information handling system comprising:
   a processor;
   a data processing unit communicatively coupled to the processor;
   a logic device communicatively coupled to the processor and configured to, responsive to a shutdown event associated with the information handling system, cause a power system of the information handling system to maintain delivery of electrical energy to the data processing unit until receiving a command to cause withdrawal of the electrical energy to the data processing unit; and
   a management controller communicatively coupled to the processor, the data processing unit, and the logic device, and configured for out-of-band management of the information handling system, the management controller further configured to, responsive to the shutdown event:
      cause a host operating system executing on the processor to gracefully shutdown;
      cause a data processing unit operating system executing on the data processing unit to gracefully shutdown; and
      responsive to receiving an indication that the data processing unit operating system has gracefully shutdown, communicate the command to the logic device to cause withdrawal of the electrical energy to the data processing unit.

2. The information handling system of claim 1, wherein the logic device comprises a complex programmable logic device.

3. The information handling system of claim 1, wherein the data processing unit comprises a smart network interface card.

4. The information handling system of claim 1, the management controller further configured to poll firmware of the data processing unit to determine a status of the graceful shutdown of the data processing unit operating system.

5. A method, in an information handling system comprising a processor, a data processing unit communicatively coupled to the processor, a logic device communicatively coupled to the processor and configured to, responsive to a shutdown event associated with the information handling system, cause a power system of the information handling system to maintain delivery of electrical energy to the data processing unit until receiving a command to cause withdrawal of the electrical energy to the data processing unit, and a management controller communicatively coupled to the processor, the data processing unit, and the logic device and configured for out-of-band management of the information handling system, the method comprising, responsive to the shutdown event:
   causing, by the management controller, a host operating system executing on the processor to gracefully shutdown;
   causing, by the management controller, a data processing unit operating system executing on the data processing unit to gracefully shutdown; and
   responsive to receiving an indication that the data processing unit operating system has gracefully shutdown, communicating, by the management controller, the command to the logic device to cause withdrawal of the electrical energy to the data processing unit.

6. The method of claim 5, wherein the logic device comprises a complex programmable logic device.

7. The method of claim 5, wherein the data processing unit comprises a smart network interface card.

8. The method of claim 5, further comprising polling, by the management controller, firmware of the data processing unit to determine a status of the graceful shutdown of the data processing unit operating system.

9. An article of manufacture comprising:
   a non-transitory computer-readable medium; and
   computer-executable instructions carried on the computer-readable medium, the instructions readable by a management controller of an information handling system in an information handling system comprising a processor and a data processing unit communicatively coupled to the processor, and the management controller communicatively coupled to the processor, the data processing unit, and the logic device, and configured for out-of-band management of the information handling system, the instructions, when read and executed, for causing the management controller to, responsive to the shutdown event:
      cause a host operating system executing on the processor to gracefully shutdown;

cause a data processing unit operating system executing on the data processing unit to gracefully shutdown; and responsive to receiving an indication that the data processing unit operating system has gracefully shutdown, communicate the command to a logic device to cause withdrawal of the electrical energy to the data processing unit.

10. The article of claim 9, wherein the logic device comprises a complex programmable logic device.

11. The article of claim 9, wherein the data processing unit comprises a smart network interface card.

12. The article of claim 9, the instructions for further causing the management controller to poll firmware of the data processing unit to determine a status of the graceful shutdown of the data processing unit operating system.

\* \* \* \* \*